April 30, 1957
R. J. GAUBERT
2,790,540
CONVEYING APPARATUS
Original Filed Oct. 19, 1948
14 Sheets-Sheet 1
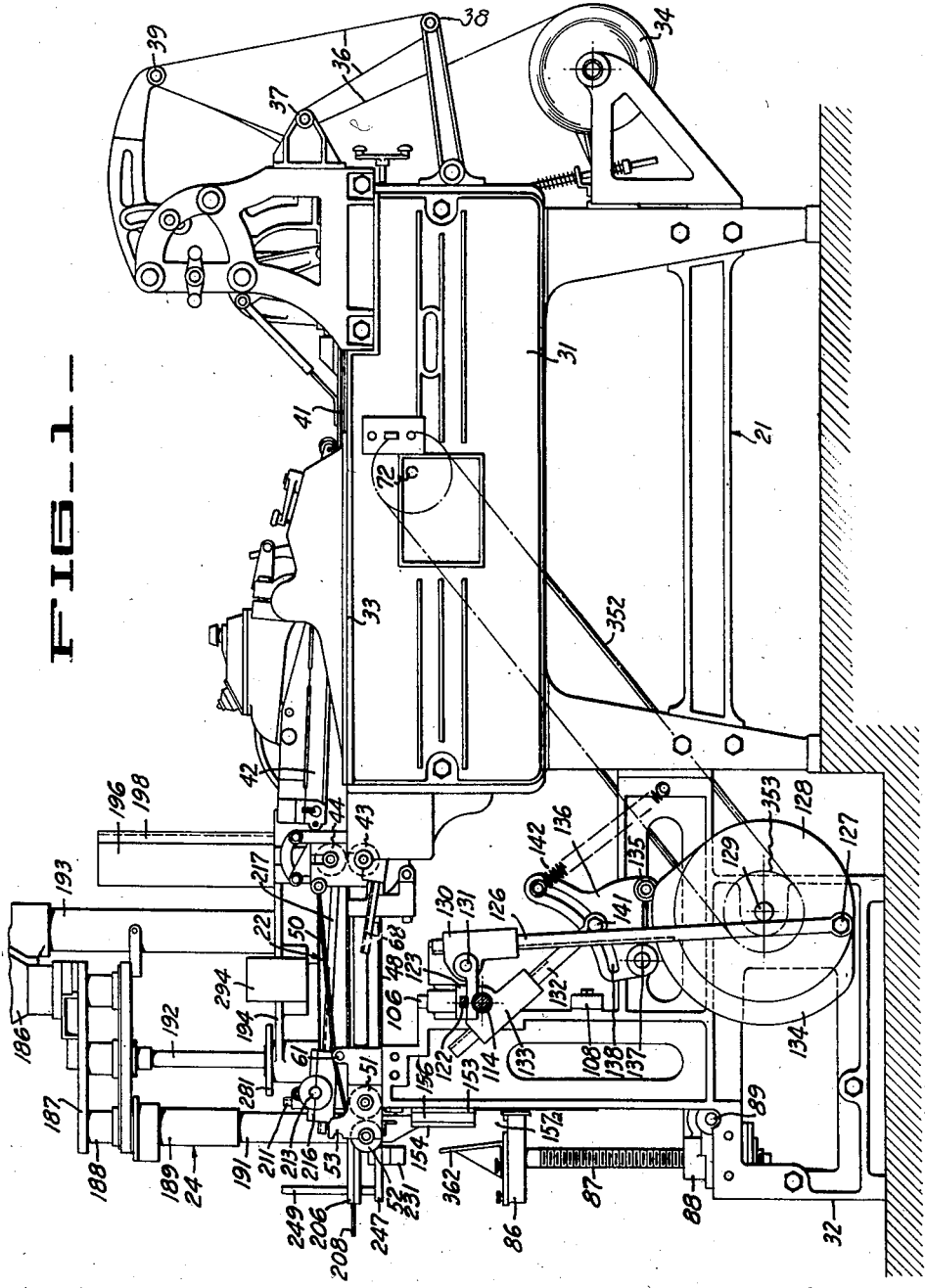
INVENTOR.
Rene J. Gaubert
BY
ATTORNEYS

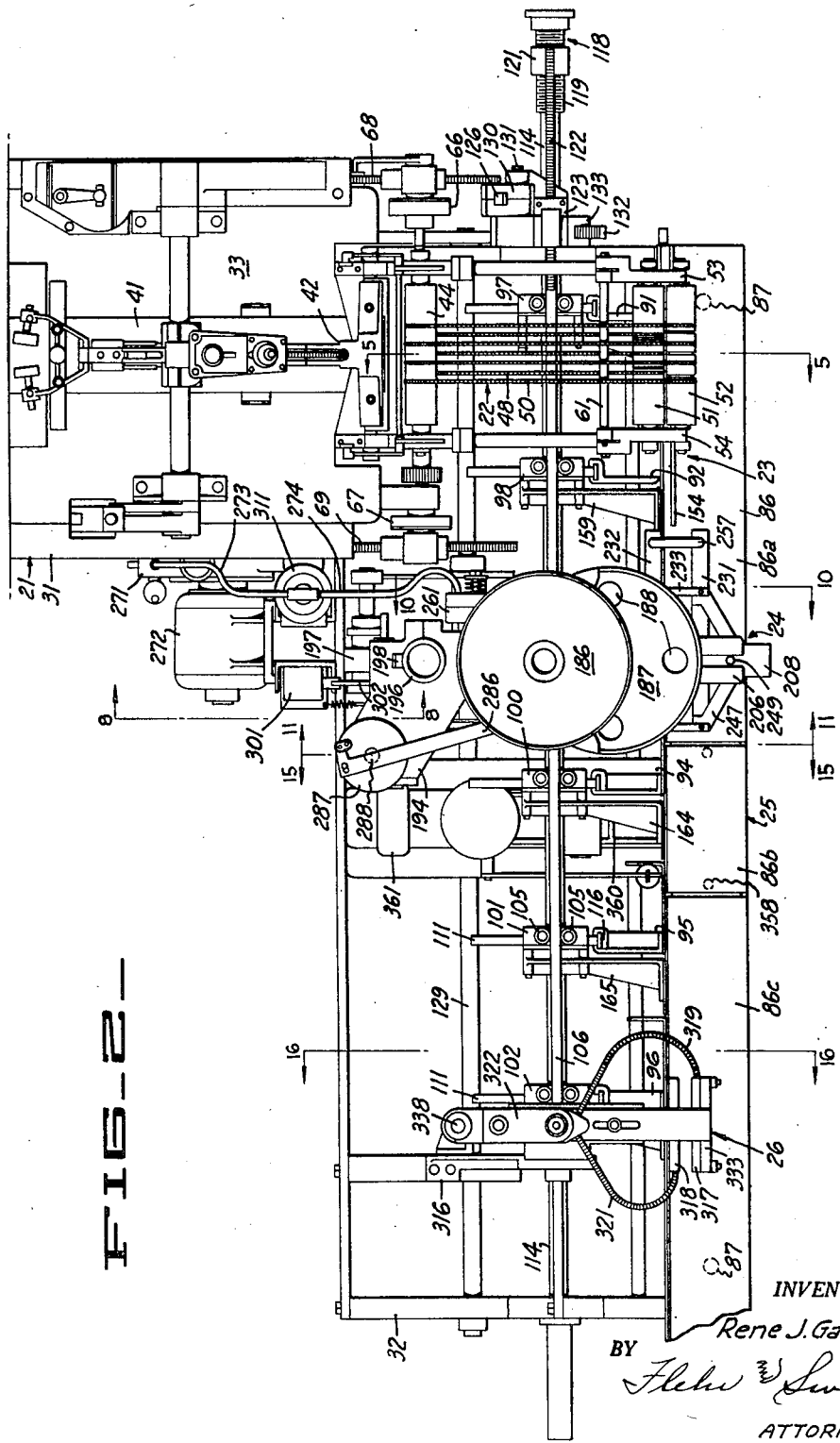

April 30, 1957  R. J. GAUBERT  2,790,540
CONVEYING APPARATUS
Original Filed Oct. 19, 1948  14 Sheets-Sheet 3
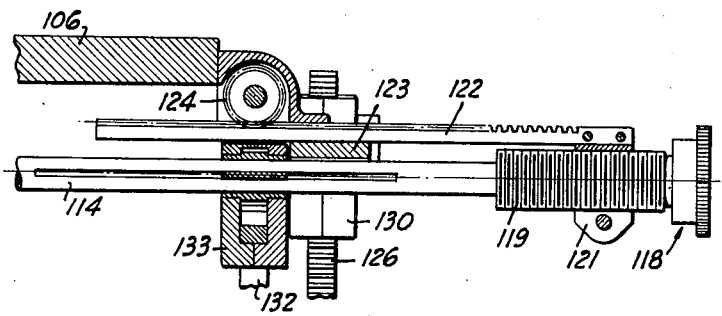
FIG_4_
FIG_3_
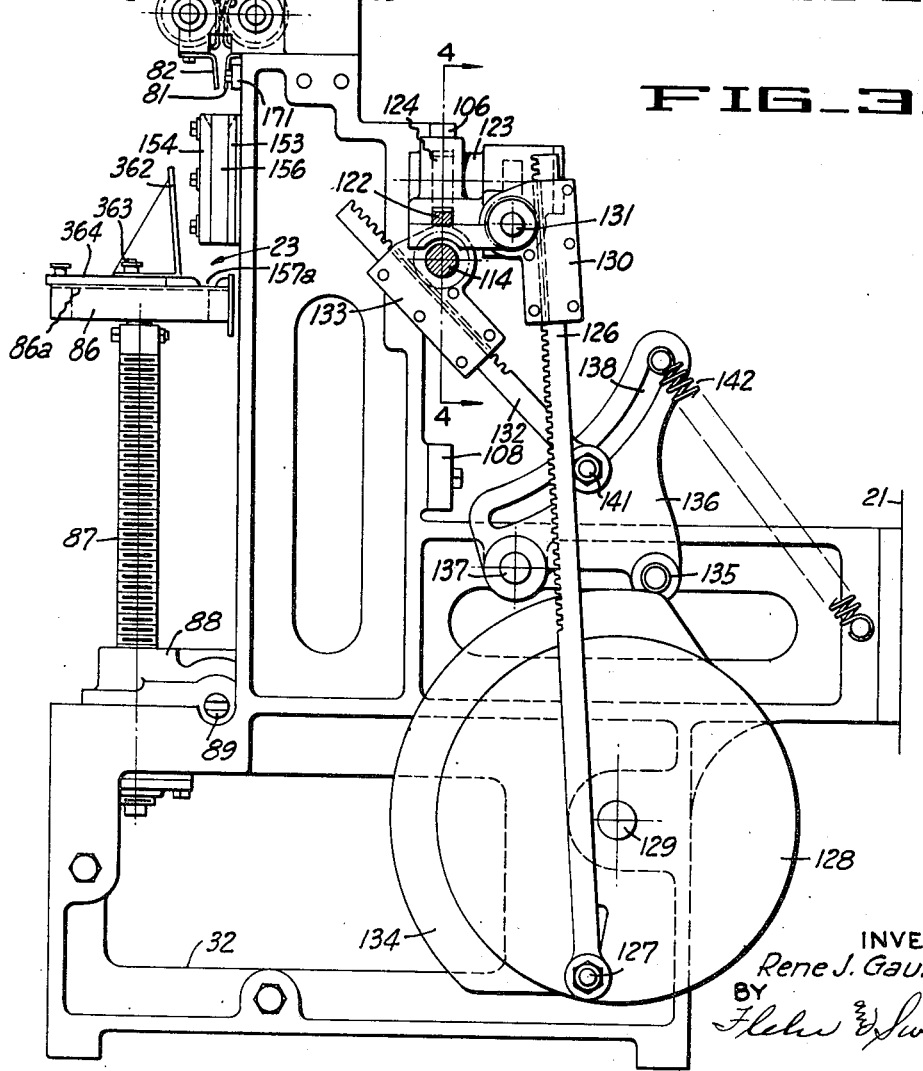
INVENTOR
Rene J. Gaubert
BY
ATTORNEYS

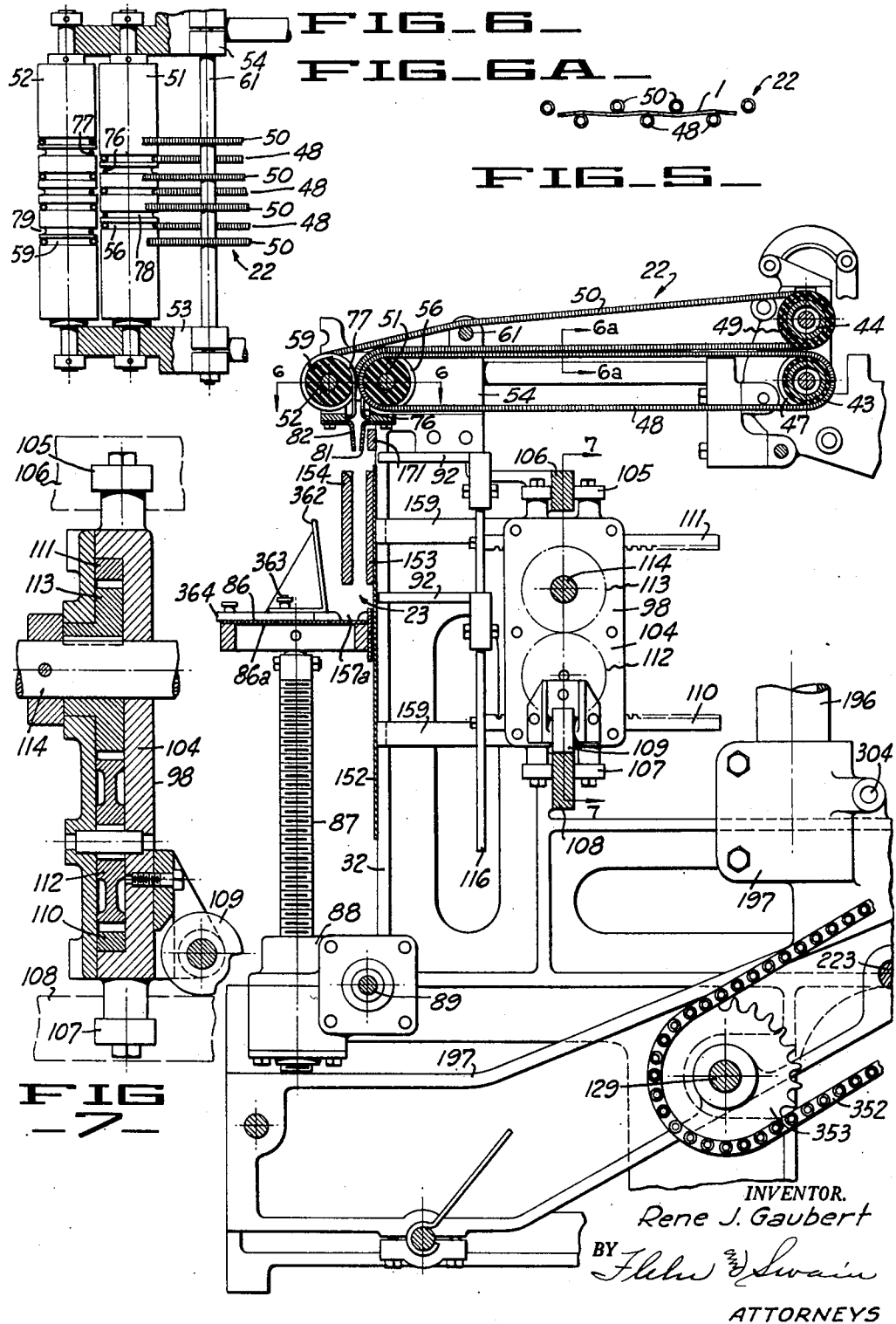

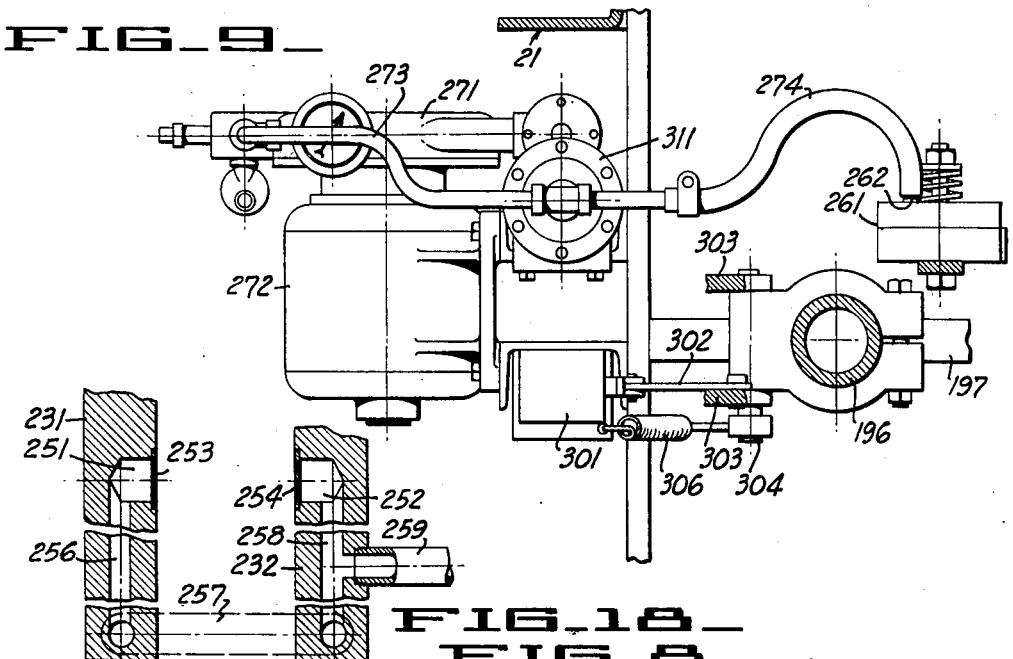
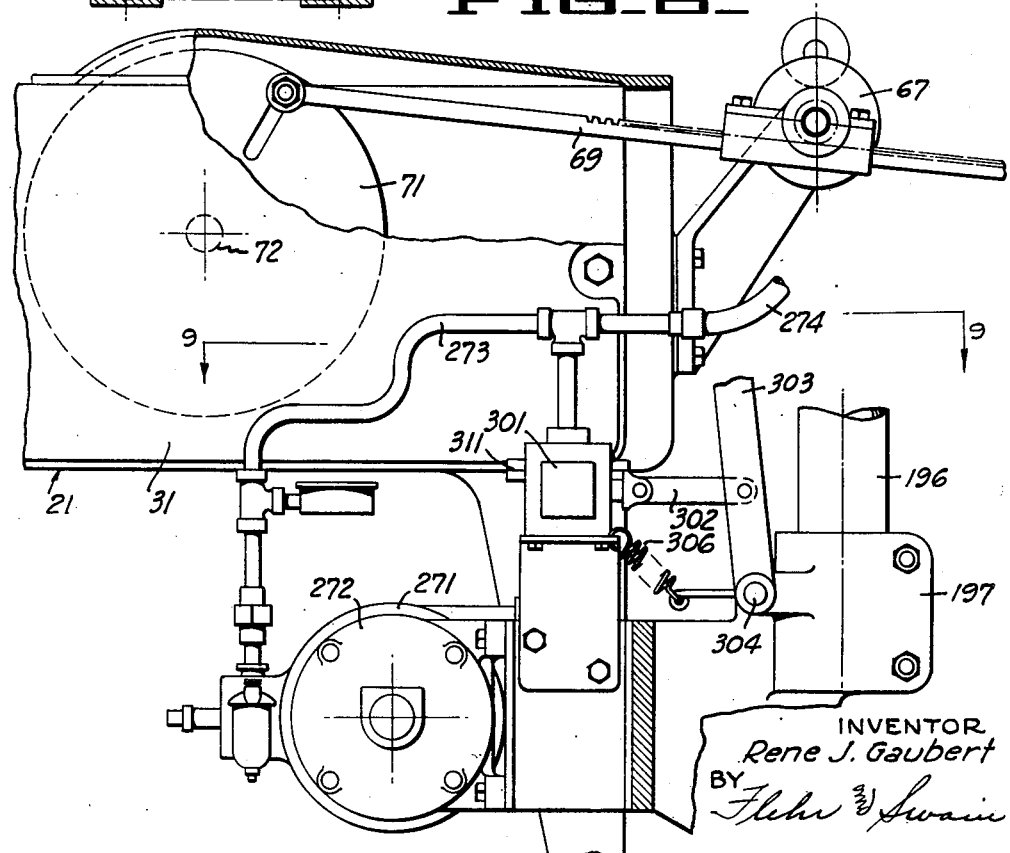

April 30, 1957 R. J. GAUBERT 2,790,540
CONVEYING APPARATUS
Original Filed Oct. 19, 1948 14 Sheets-Sheet 6
FIG_10_
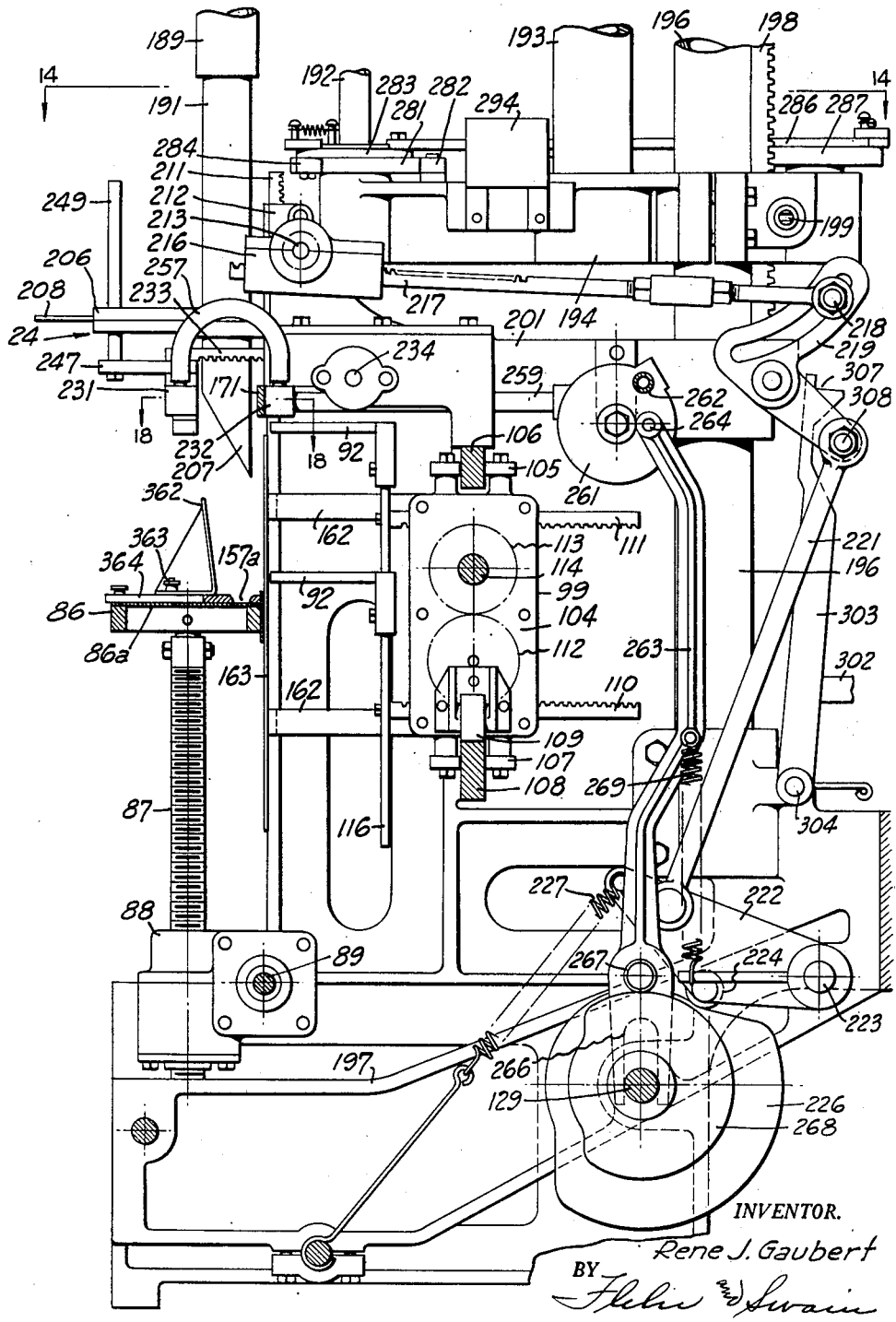
INVENTOR.
Rene J. Gaubert
BY
ATTORNEYS

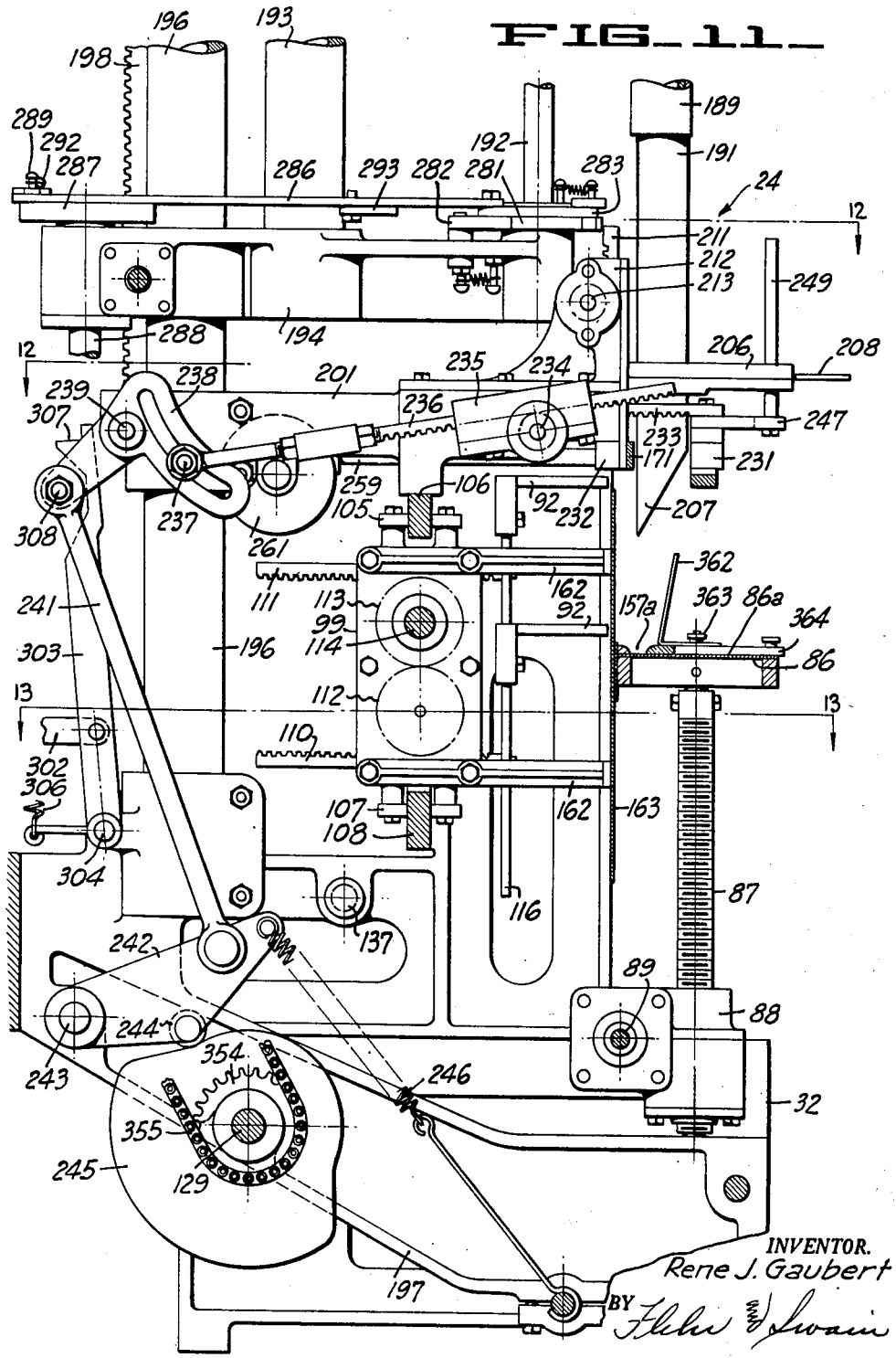

April 30, 1957 R. J. GAUBERT 2,790,540
CONVEYING APPARATUS
Original Filed Oct. 19, 1948 14 Sheets-Sheet 8
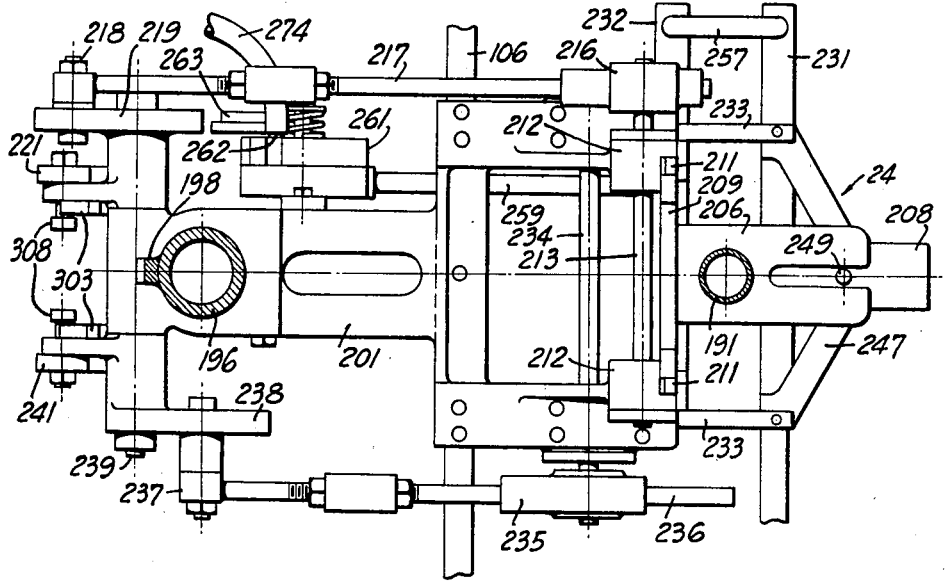
FIG_12_
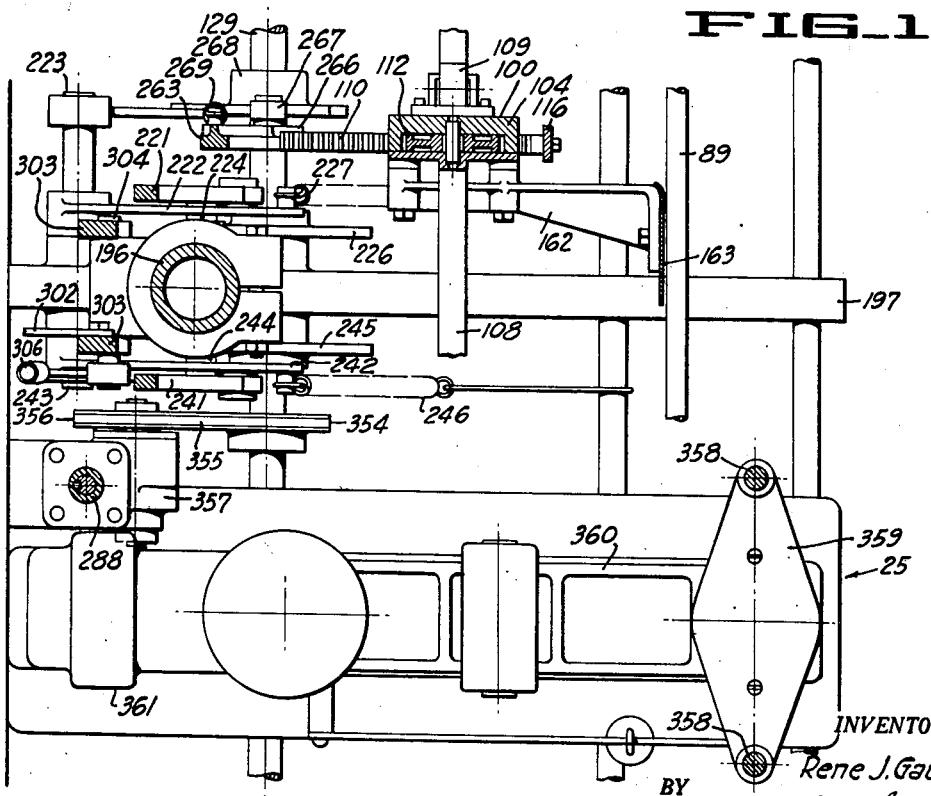
FIG_13_
INVENTOR.
Rene J. Gaubert
BY
ATTORNEYS April 30, 1957
R. J. GAUBERT
2,790,540
CONVEYING APPARATUS
Original Filed Oct. 19, 1948
14 Sheets-Sheet 9
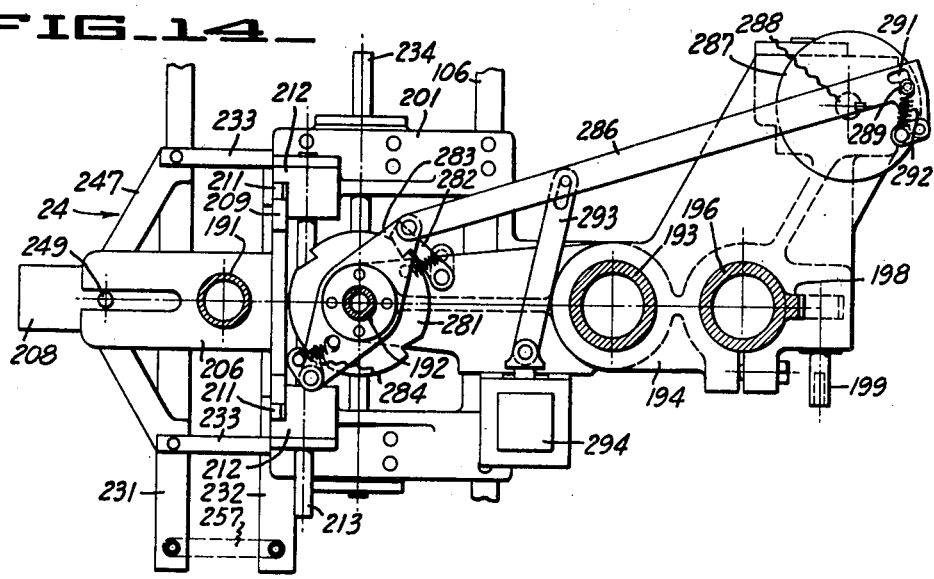
FIG_14_
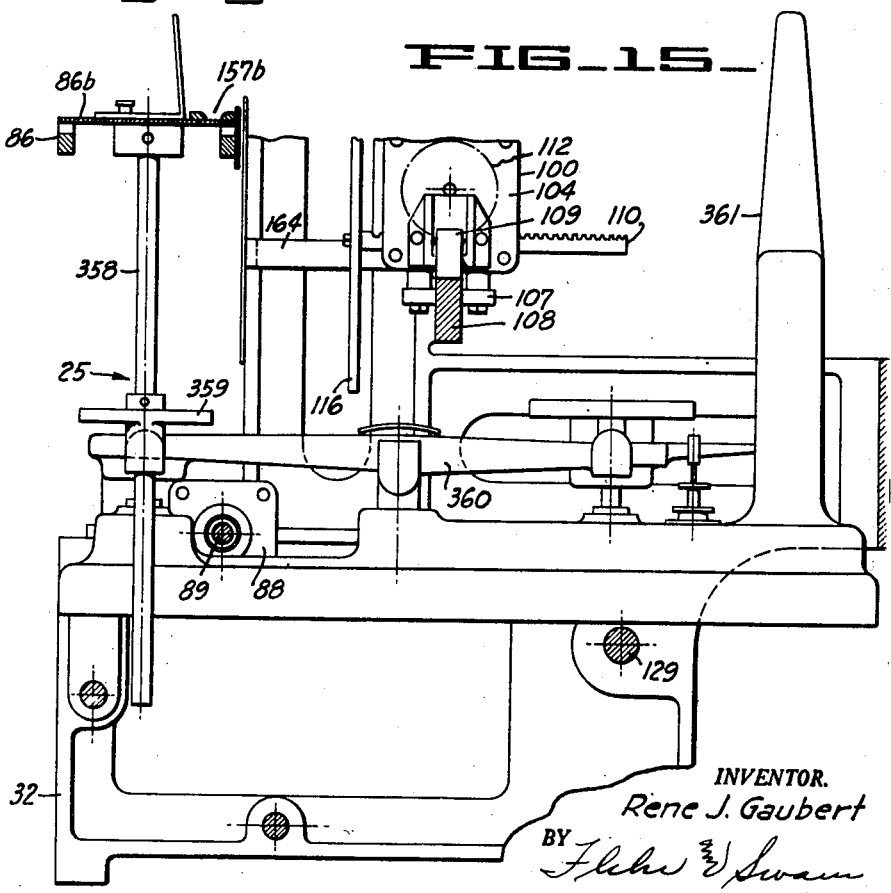
FIG_15_
INVENTOR.
Rene J. Gaubert
BY
ATTORNEYS

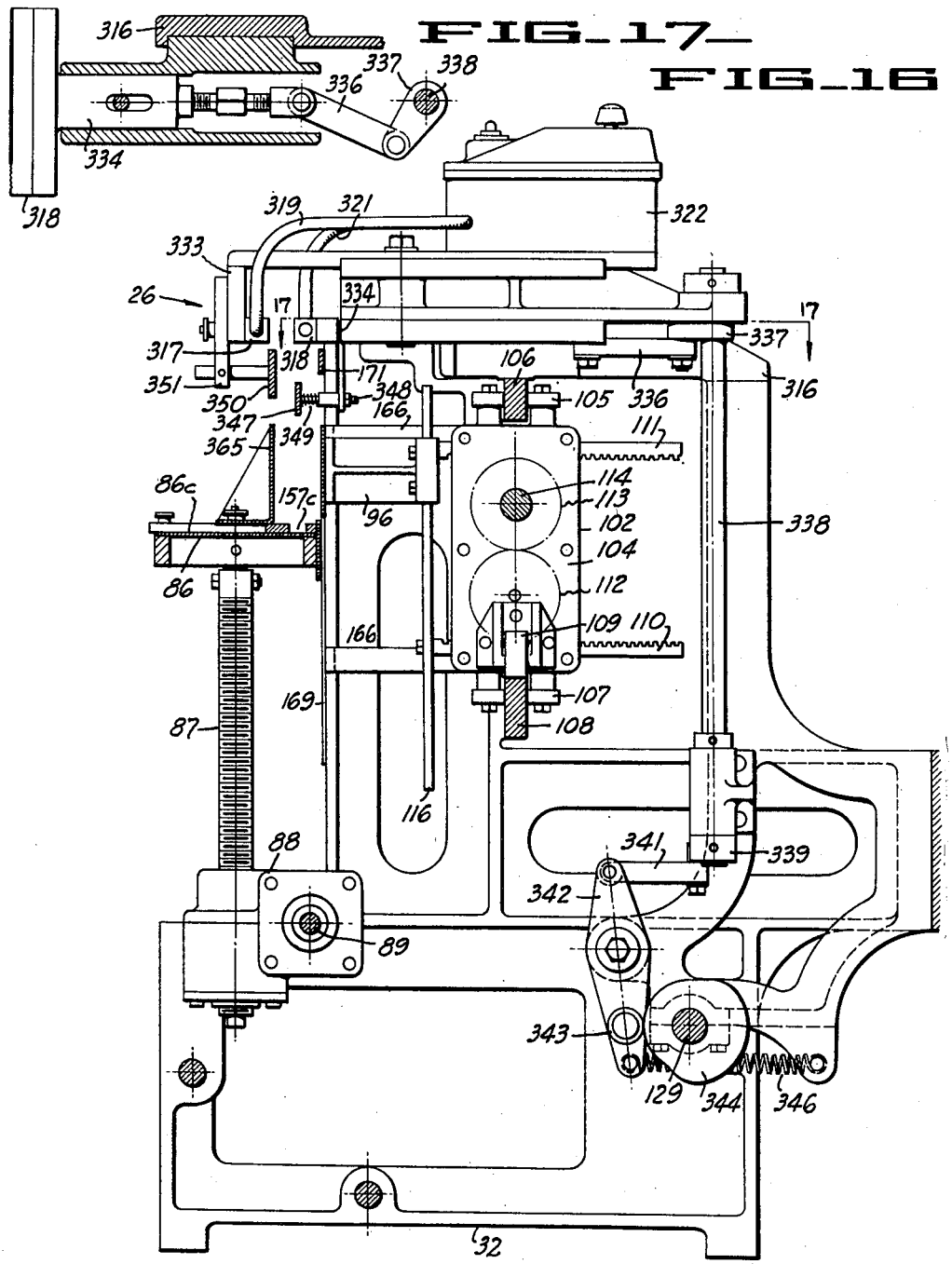

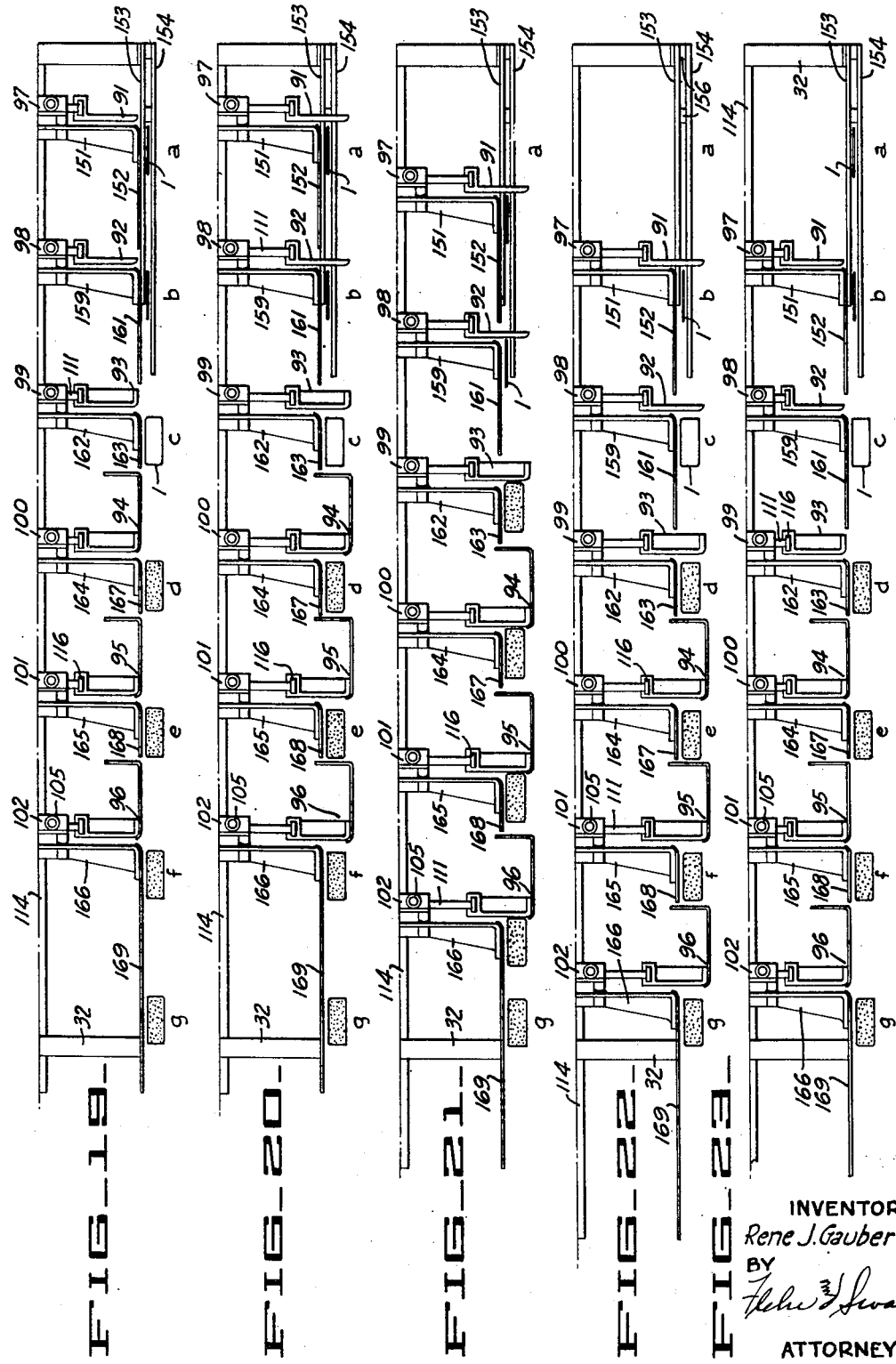

April 30, 1957 R. J. GAUBERT 2,790,540
CONVEYING APPARATUS
Original Filed Oct. 19, 1948 14 Sheets-Sheet 12
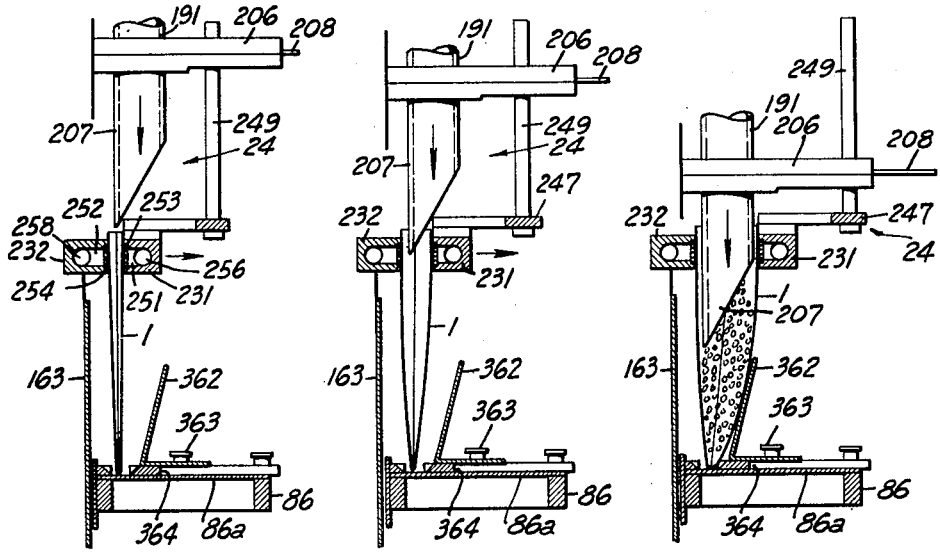
FIG_24_ FIG_25_ FIG_26_
FIG_27_ FIG_28_
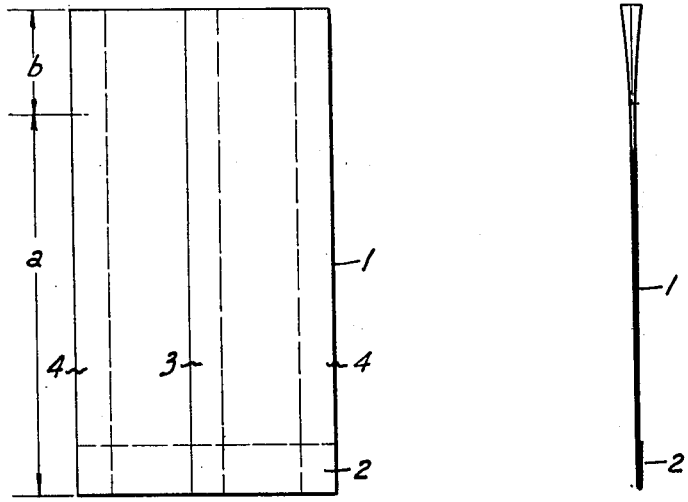
INVENTOR
Rene J. Gaubert
BY
ATTORNEYS

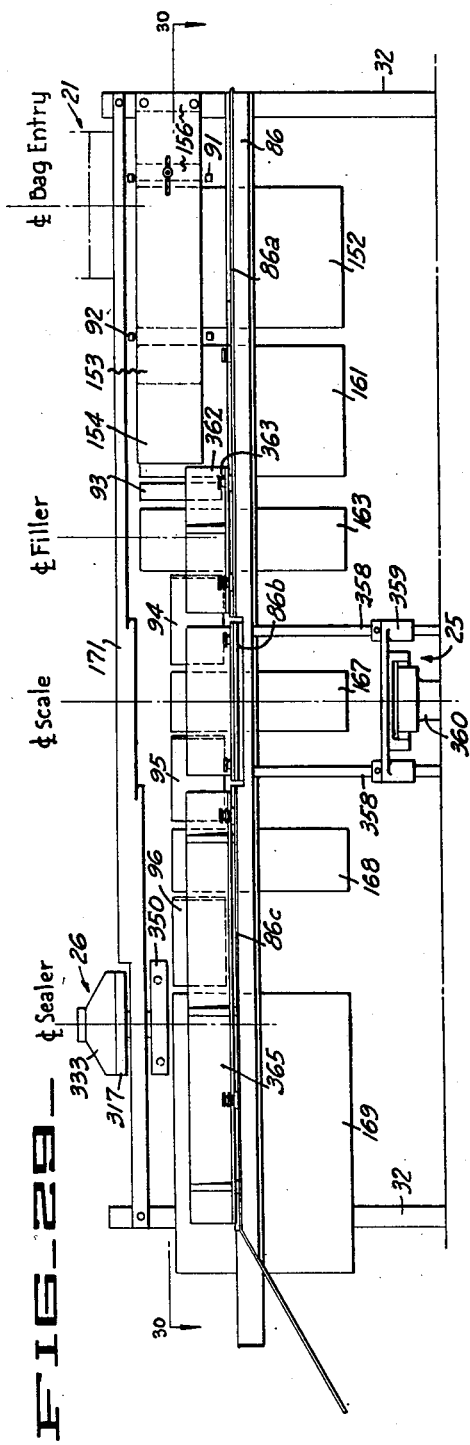
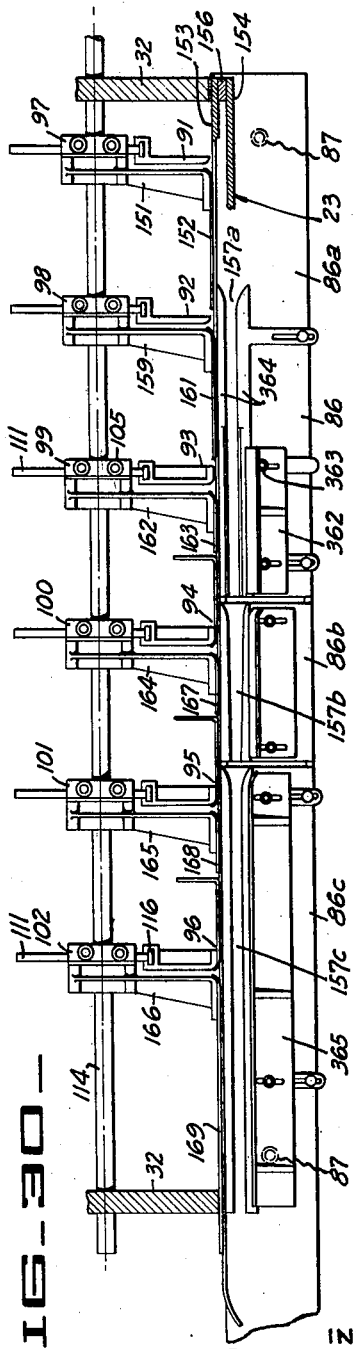

April 30, 1957
R. J. GAUBERT
2,790,540
CONVEYING APPARATUS
Original Filed Oct. 19, 1948
14 Sheets-Sheet 14
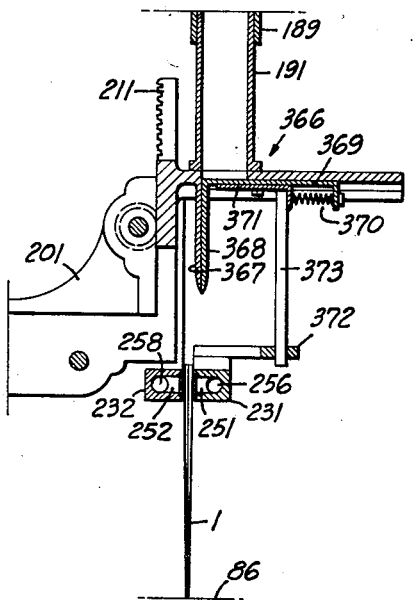
FIG_31_
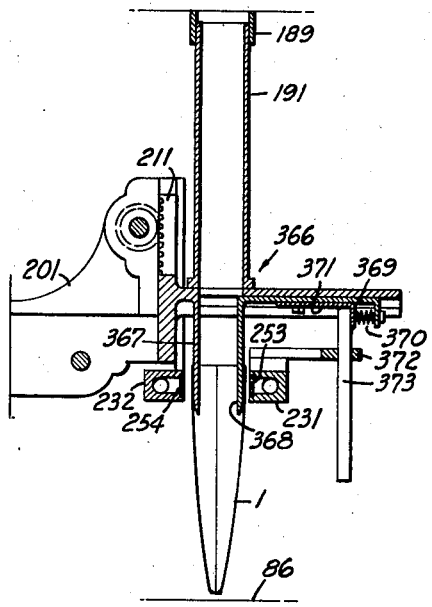
FIG_32_
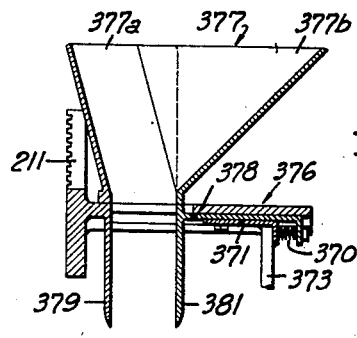
FIG_33_
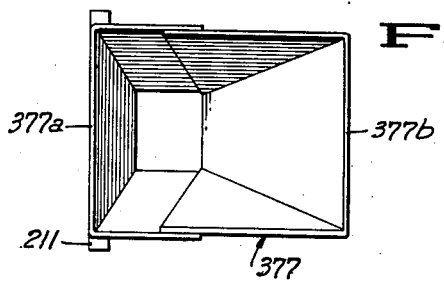
FIG_34_
INVENTOR
Rene J. Gaubert
BY
ATTORNEYS United States Patent Office 2,790,540
Patented Apr. 30, 1957

2,790,540

CONVEYING APPARATUS

Rene J. Gaubert, Oakland, Calif., assignor, by mesne assignments, to Food Machinery and Chemical Corporation, San Jose, Calif., a corporation of Delaware Original application October 19, 1948, Serial No. 55,395. Divided and this application June 10, 1950, Serial No. 167,404

7 Claims. (Cl. 198—224)

This invention relates generally to conveying apparatus suitable for the transfer of various objects between operating stations. It is particularly applicable for use in conjunction with bag filling operations.

This application is a division of my copending application Serial No. 55,395, filed October 19, 1948, now Patent No. 2,676,442, for "Bagging Machine."

In my aforesaid application Serial No. 55,395, now Patent No. 2,676,442, there is disclosed a machine which serves to manufacture bags from Cellophane, Pliofilm or like material, and to fill these bags automatically with various products such as candy, nuts, dried fruits and the like. Such a machine requires special conveying means to convey the bags through the various operating stations. Thus the bags after their manufacture must be conveyed successively to a filling station where the bags are opened and a measured amount of the product inserted. From the filling station the bags must be transferred successively to a sealing station where the upper ends of the bags are folded and sealed. The bags must therefore be moved intermittently both before and after being filled, and they must be moved in such a manner that the bags are not in any way injured and whereby the bags are presented relatively accurately to the various operating stations.

It is an object of the present invention to provide a novel form of conveying apparatus suitable for use with bagging machines such as described above.

A further object of the invention is to provide a novel type of conveying means capable of moving the bags intermittently and which will pass the bags through the various operating stations without injury or spill.

Another object of the invention is to provide conveying means of the above character which will make possible any number of desired stations for carrying out operations on the bag, thereby accommodating as many operations as may be desired.

Additional objects and features of the invention will appear from the following description in which the preferred embodiment has been illustrated in conjunction with the accompanying drawing.

Referring to the drawing:

Figure 1 is an end elevational view illustrating a machine incorporating the present invention.

Figure 2 is a plan view of the machine.

Figure 3 is a detail on an enlarged scale, showing certain parts at the same end of the machine illustrated in Figure 1.

Figure 4 is an enlarged cross-sectional detail taken along the line 4—4 of Figure 3.

Figure 5 is an enlarged section taken along the line 5—5 of Figure 2, showing some of the same parts illustrated in Figure 1, including particularly the means for conveying bags from the bag making machine to the transfer and conveying means.

Figure 6 is a cross-sectional detail taken along the line 6—6 of Figure 5.

Figure 6A is a detail in section showing the way in which a bag is engaged by the belts 48, 50.

Figure 7 is a cross-sectional detail taken along the line 7—7 of Figure 5.

Figure 8 is an enlarged cross-sectional detail taken along the line 8—8 of Figure 2, and illustrating a portion of the pneumatic means employed to prevent the fill of a bag which has improperly opened.

Figure 9 is a cross-sectional detail taken along the line 9—9 of Figure 8, and likewise showing parts of the pneumatic means employed to prevent fill of a bag which has not properly opened.

Figure 10 is a cross-sectional view taken along the line 10—10 of Figure 2, showing various parts of the machine, including parts of the transfer and conveying means and the bag filling means.

Figure 11 is a cross-sectional view taken along the line 11—11 of Figure 2, and showing various parts of the machine including certain of the driving elements.

Figure 12 is a cross-sectional view taken along the line 12—12 of Figure 11.

Figure 13 is a cross-sectional view taken along the line 13—13 of Figure 11.

Figure 14 is a cross-sectional view taken along the line 14—14 of Figure 10.

Figure 15 is a cross-sectional view taken along the line 15—15 of Figure 2.

Figure 16 is a cross-sectional view taken along the line 16—16 of Figure 2.

Figure 17 is an enlarged cross-sectional detail taken along the line 17—17 of Figure 16.

Figure 18 is a cross-sectional view taken along the line 18—18 of Figure 10.

Figures 19 to 23 inclusive are diagrammatic views for the purpose of illustrating the manner in which the operating units for the bag engaging elements are actuated to intermittently move the bags from one station to the next.

Figure 24 to 26 inclusive are diagrammatic details in section illustrating the operation of parts in a bag filling operation.

Figures 27 and 28 are side and edge views respectively showing a typical bag such as manufactured by the bag making unit of my Patent No. 2,347,902.

Figure 29 is a front view of a portion of my machine, particularly the parts constituting the intermittent conveying means 23, other parts being removed for clarity.

Figure 30 is a plan view of the same parts illustrated in Figure 29.

Figures 31 and 32 are side elevational views in section, illustrating another embodiment of the bag filling means, and showing the same in two different operating positions.

Figure 33 is a side elevational view in section, illustrating another embodiment of the bag filling means.

Figure 34 is a plan view of the bag filling means illustrated in Figure 33.

In order to facilitate an understanding of the conveying means forming the present invention, I have illustrated it incorporated in a complete bagging machine as disclosed and claimed in the aforesaid copending application Serial No. 55,395, now Patent No. 2,676,442.

Referring to Figures 1 and 2, this machine generally includes a bag making unit 21, conveying means 22 which receives the bags from the bag making unit, intermittent conveying means 23 which receives the bags and presents them to the several operating stations, the measuring and bag filling unit 24, the weigh check station 25 and the sealing unit 26.

For the bag making unit I prefer to use a machine which will prepare the bags from a web of material, and present them successively to the conveying means 22. A suitable machine for this purpose is disclosed and claimed in my Patent No. 2,347,902, entitled "Bag Making Machine and Methods." Thus as illustrated in the drawing the bag making unit comprises a frame 31 which can be suitably attached to the main frame 32 of the machine, and which provides a working table 33. The rear end of the machine is arranged to support the roll 34 of suitable bag making material such as moistureproof Cellophane or Pliofilm, and the web 36 from this roll is shown extending over the rolls 37, 38 and 39, and from thence under the rear end of the former mandrel 41. This mandrel corresponds to the mandrel 91 of Patent 2,347,902. Overlying the mandrel 41 there is an electrically heated sealer 42, the lower surface of which is T shaped. The sealer is periodically reciprocated to perform sealing operations on the bottom end of the bag, and for making the longitudinal seam.

As explained in said Patent 2,347,902 the machine incorporates means for folding a projecting portion of the bag material over the forward end of the mandrel, immediately preceding the sealing operation, together with means for thereafter reciprocating the mandrel to translate the finished end of the bag into engagement with the rollers 43 and 44, which correspond to the rollers 116, 117 of Patent 2,347,902. In addition knives (not shown in detail) are provided in proximity with the feed rolls 43 and 44, which sever the finished bag from the remainder of the material along a line adjacent to but spaced from a vertical plane coincident with the axes of rollers 43, 44.

The cycle of operation of the bag making machine is clearly disclosed in my Patent 2,347,902. Briefly, as the web of material is drawn beneath the mandrel 41, the two side margins of the web are folded over the top of the mandrel into overlapping relation. Assuming that a previous bag has been completed, the overlapping portions of the web will be heat sealed for a substantial distance from the cut end of the material, so that in effect there is a tube of bag froming material about the mandrel. A sufficient amount of material projects beyond the end of mandrel 41, to form the bottom of a bag. Folding means turns the projecting end of the material over the top of the end of the mandrel, and immediately thereafter the heat sealing means 42 is depressed to heat seal the bottom of the bag, and at the same time to extend the length of the longitudinal seam. The mandrel is then reciprocated so that the folded over and heat sealed end of the bag is translated into engagement with the rollers 43 and 44, and at the same time these rollers are rotated in opposite directions to draw a predetermined length of material from the mandrel. The rollers are then separated a sufficient amount to release their grip upon the bag, and then the cutting means severs the bag a short distance from rollers 43, 44. During this cutting operation rotation of the rollers 43, 44 is interrupted, but immediately after the bag is cut, the rollers are rotated again for a short interval to advance the cut bag by the conveying means to be presently described. This last rotation occurs during a sealing operation for forming the next bag. As will be presently explained a common drive is provided for the bag making unit and other parts of the bagging machine, whereby the bags are made at a rate corresponding to the rate with which the bags are received and successively filled by the remainder of the machine. The means for rotating and releasing rollers 43, 44, and the construction of the completed bags, will be presently described in greater detail.

The conveying means 22 forms a part of the present invention and is so constructed that it takes the individual bags from the bag making unit, and delivers them successively to a receiving station of the conveying means 23. The construction of the conveying means 22 can be best seen in Figures 5 and 6, taken together with Figure 2. The roller 43 is shown provided with a plurality of grooves 47 serving to track the looped ends of the laterally spaced belts 48. Roller 44 is provided with grooves 49 for tracking the laterally spaced belts 50.

A pair of laterally spaced parallel rollers 51 and 52 are rotatably carried by the mounting brackets 53 and 54. Roller 51 is provided with grooves 56 for tracking the belts 48. Roller 52 is provided with grooves 59 for tracking the belts 50. In this particular instance there are three belts 48, and four belts 50, and the two sets of belts are in interposed vertical planes as shown in Figure 6. The upper runs of the belts 50 preferably have light contact with the transverse roller 61. The lower runs of the belts 50 engage a portion of the periphery of roller 51 between the grooves 56. The belts 48 and 50 can be made of suitable material such as resilient rubber, or as endless helicoid wire springs as illustrated. The upper runs of the belts 48, and the lower runs of the belts 50, are preferably slightly interleaved whereby when a bag 1 progresses to the left from engagement with the rollers 43 and 44 (Figures 6 and 6A) the bag is caused to assume a corrugated form whereby it is held in light frictional engagement with the belts.

As previously explained in the operation of the machine the rollers 43 and 44 are rotated in a particular manner for the purpose of withdrawing the finished bag from the forming mandrel, and for advancing it to the conveying means 23. The mechanism for effecting this rotation is shown in Figure 2. At one side of the bag making machine the shaft for the lower roller 43 is coupled to an overrunning clutch 66, and on the other side is coupled to a second overrunning clutch 67. The drive shafts of the two overrunning clutches 66, 67 are connected to pinions (not shown) which in turn are operated by the reciprocating racks 68, 69. Back 68 corresponds with the gear rack 152 of my Patent 2,347,902 (see Figure 8 of that patent) and is operatively attached to an adjustable throw crank, which in turn is mounted upon the main transverse shaft 72 of the bag making machine, all as shown in said Patent 2,347,902. Thus for each bag making cycle reciprocation of the rack 68 causes a predetermined amount of rotation of the roller 43 in a counterclockwise direction as viewed in Figure 1.

Upon the other side of the bag making machine (see Figure 8) the rack 69 is similarly connected to a crank disc 71, which in turn is mounted upon the same transverse shaft 72. The stroke of rack 69 is arranged whereby after rack 68 has caused rotation of roller 43, and there has been a period of pause, during which the bag is being severed, rack 69 causes a further amount of rotation of roller 43, which motion occurs during the heat sealing operation of the next bag making cycle. As described in said Patent 2,347,902 the means for bringing the two rollers 43 and 44 together into gripping engagement with a bag, and for separating these rollers to release the bag, includes cam means carried by the same shaft 72. This means operates to press the rollers 43 and 44 upon the bag during the rotation caused by rack 68, and then the rollers are separated and remain in this relation during rotation by rack 69, and until the rollers are caused to engage the next bag.

It will be evident that as the finished bag is being conveyed by the belts 48 and 50, it is caused to be bent over the roller 51 and then discharged downwardly in a substantially vertical plane intermediate the axes of rollers 51 and 52. In order to aid the proper downward discharge of the bag I provide stripper fingers 76 and 77 which are attached to an adjacent stationary part of the machine, and which have curved upper ends accommodated in the supplemental grooves 78 and 79, provided in the rollers 51 and 52 (see Figure 6). In addition spaced guide plates 81 and 82 can be provided to afford a discharge slot through which the bags are caused to pass.

The conveying means designated generally at 23 receives the finished bags from the bag making machine, and then intermittently progresses these bags through the various operating stations, including for example automatic filling, weighing and sealing. The detailed construction illustrated includes a horizontal table or counter 86 which extends along the front of the machine, and which is attached to the upper ends of the vertical threaded standards 87 (Figure 5). The standards 87 are slidably carried by the castings 88, each of which contains a pinion threaded upon the associated standard 87 and gearing associated with the pinion for operatively connecting the same to the horizontal shaft 89. At one end of the machine the shaft 89 can be connected to a hand crank to enable raising or lowering of the table 86 to a desired level. Plates 86a, 86b and 86c (Figure 2) are shown forming the actual horizontal surface over which the bag is traversed. The plates 86a and 86c are directly attached to and form a part of the table 86. The intermediate plate 86b is vertically movable and is attached to weighing means as will be presently described.

Mechanism is provided, including a plurality of bag engaging elements, which intermittently engage and advance the bags along the length of the table 86. These elements include the fingers 91 and 92 (Figures 2, 29, and 30), together with the elements 93 to 96 inclusive. They are caused to traverse a substantially rectangular locus for the purpose of engaging and advancing each bag a predetermined distance, then retracting from engagement with the bag, and returning cyclically for the next intermittent movement. For convenience in engaging the bag before it is filled there are two fingers 91 and two fingers 92, which are vertically spaced. Elements 93 to 96 are made to larger dimensions to provide more substantial surfaces for engaging one side of the filled bag. The elements 91 to 96 are cooperatively connected with operating units 97 to 102 inclusive respectively, which are each substantially duplicates. Figures 7, 10 and 11 illustrate the operating units, and a description of one unit will suffice for all. Briefly it consists of a housing 104 having an upper pair of rollers 105, which engage the stationary horizontal guide bar 106. The lower end of the housing 104 is provided with guide rollers 107 which engage opposite sides of the fixed horizontal guide rod 108. Additional rollers 109 engage the top of the guide rod 108.

Housing 104 also carries a pair of vertically spaced horizontal gear racks 110, 111, which within the housing engage the teeth of the pinions 112, 113. The teeth of these pinions are in direct engagement so that the two racks 110, 111 are constrained to reciprocate horizontally in unison. The pinion 113 is attached to a horizontal drive shaft 114 which extends the length of the machine between the guide bars 106, 108. Corresponding ends of the racks 110, 111 are attached to the vertical bar 116, which in turn forms a mounting for the bag engaging means which in this instance is formed by element 92.

At one end of the machine (Figure 2) rod 114 is extended, and is provided with a bearing assembly 118 (Figure 4). This assembly includes a threaded sleeve 119 within which rod 114 may rotate and which is adjustably engaged by the nut 121. A gear rack 122 is attached to the nut 121, and is slidably fitted in the gear housing 123. The gears within the housing 123 (Figures 3 and 4) include a pinion 124 which engages the rack 122, and additional gear elements operatively connecting this gear with a reciprocating rack 126. Rack 126 has its lower end connected at 127 to the disc 128, which is attached to the main shaft 129. The casting 130 through which rack 126 extends, may oscillate about the counter shaft 131 of the gearing. As shaft 129 rotates, rack 126 is reciprocated through the casting 130 and as a result the rack 122 is reciprocated to reciprocate the horizontal rod 114.

The means provided for rotating the rod 114 includes a gear rack 132 (Figure 3) which is slidably guided in the housing 133. This housing is journaled upon the rod 114, and carries a pinion which is splined to the rod, whereby when the rack 132 is reciprocated, the rod is rotated.

Shaft 129 carries a cam 134, the surface of which is engaged by a cam roller 135, carried by the adjustable throw cam lever 136. This lever is pivotally mounted upon the frame of the machine at 137, and is provided with a slot 138, forming an adjustable means for the pivotal attachment 141 to the rack 132. A tension spring 142 urges the arm 136 in a direction to maintain the roller 135 against the cam surface. In place of utilizing such a return spring I may employ a cam provided with a groove for positive return movement.

It will be evident from the foregoing that as the shaft 129 rotates, the rod 114 is reciprocated horizontally in the direction of its length over a predetermined distance, and in addition, it is rotated angularly in opposite directions. The contouring and angular displacement of the cam 134 is such that rod 114 is rotated to effect reciprocation of the racks 110, 111 at the end of its (rod 114) reciprocating movement in a horizontal direction. Therefore the bag engaging elements carried by the racks 110, 111 have a locus of movement which is rectangular.

In addition to the bag engaging elements, vertical bag supporting surfaces are provided which are reciprocated in a horizontal direction. The members forming such vertical surfaces may vary in different instances, according to the set-up of the machine and the type of material and size of bags being handled. For the location where the bag is being received the unit 97 is shown provided with a bracket 151, to support the vertical plate 152. This plate is disposed immediately behind a vertical guide plate 153, which is of limited height to permit the spaced fingers 91 to pass above and below the same. In front of the plate 153 there is another guide plate 154 which for convenience may be made of transparent material, and which is adjustably carried by suitable means such as brackets 156. As shown in Figure 1 the bag is received between the plates 153 and 154, for advancement to the filling station. It is desirable adjacent this location to provide a supplemental guide groove 157a (Figures 1 and 30) for the lower end of the bag, and which is in alignment with like grooves 157b and 157c.

The next unit 98 is similarly provided with a bracket 159, serving to support the vertical plate 161. Similarly the operating unit 99 which is disposed adjacent the filling means, is provided with a bracket 162 serving to support the plate 163. Units 100, 101 and 102 similarly are provided with brackets 164, 165 and 166, serving respectively to support the plates 167, 168 and 169. A strip or rail 171 (Figure 29) extends along the path of movement of the bags, through all of the operating stations.

Figures 19 to 23 inclusive serve to diagrammatically illustrate the manner in which the bag engaging elements serve to move the bags progressively from station to station. Figure 19 illustrates a number of bags in the successive station a to g inclusive. The bag engaging elements are in their retracted position. A bag 1 has just been deposited in station a and the preceding bag has been transferred to station b. In station c a bag is being filled. In stations d to g the filled bags are being advanced step by step. Figure 20 illustrates the bag engaging elements projected and in preparation for moving the bags to their next respective stations. Figure 21 illustrates the bags being moved by horizontal movement of all of the bag engaging elements in unison. Figure 22 illustrates all of the bags in their next successive stations, immediately prior to retraction of the bag engaging elements. Figure 23 illustrates the same position of the bags shown in Figure 22, but with the bag engaging elements retracted. From the position of parts shown in Figure 23, the bag engaging elements return to the initial positions illustrated in Figure 19.

The bag filling means illustrated makes use of conventional means for weighing or measuring out predetermined amounts of material to be introduced into the bags. Thus a hopper 186 is shown (Figure 2) which is employed in conjunction with a rotary member 187 which is provided with circumferentially spaced measuring pockets 188. The intermittent rotation of member 187 serves to recurrently deliver measured quantities of a product into the depending conduit 189, (Figure 10). Conduit 189 has slidable telescopic engagement with a conduit 191, the lower end of which is adapted to deliver the product to the bags. Shaft 192 is a part of the measuring device, and serves to turn the member 187 by angular increments sufficient to successively register the measuring pockets 188 with the conduit 189. The tubtular standard 193 (Figure 10) serves to support the hopper 186 and associated parts of the measuring device, and the lower end of this standard is carried by the mounting 194. Mounting 194 is adjustably clamped to the vertical tubular support member 196, the lower end of which is secured to a casting 197, forming a part of the machine frame. Support 196 carries a gear rack 198, which is engaged by a pinion carried by shaft 199, the latter extending laterally of the mounting 194. Manual turning of shaft 199 facilitates raising or lowering of the mounting 194. Located below the mounting 194 there is another mounting 201 which serves to support certain parts associated with the conduit 191.

The conduit 191 (Figures 10 and 12) is secured to a head 206 which is adapted to reciprocate vertically. Below the head 206 (Figure 10) the conduit 191, or an extension of the same, is cut off on a bias to form the filling spout 207. Within the head 206 there is a slidable valve gate 208, which is adapted to be moved between open and closed positions by means to be presently described. The head 206 is mounted upon a vertically disposed structure 209 (Figure 12) which in turn is attached to the two vertically extending and laterally spaced gear racks 211. Racks 211 are retained within vertical guideways formed in portions 212 of the mounting 201. Portions 212 also enclose pinions (not shown) which engage the racks 211, and which are secured to the common shaft 213. Shaft 213 is turned in opposite directions by means including a pinion mounted upon the shaft and enclosed in the housing 216 (Figure 10). The pinion is engaged and rotated by the reciprocating gear rack 217 (Figures 10 and 12) which extends slidably within the housing 216, and which has an operative connection 218 with the adjustable throw crank 219. Link 221 (Figure 10) serves to connect the crank arm 219 with a cam lever 222, which is journaled at 223 to the main frame of the machine. Arm 222 is provided with a cam roller 224, which engages the cam surface of cam 226. The cam roller is urged against the surface of the cam by the tension spring 227. Cam 226 is mounted upon the same drive shaft 129 as the cam 134.

Adjacent to the spout 207 (Figure 11) the machine is provided with forward and rear bars 231, 232 which are adapted to occupy positions in front of and to the rear of a bag in the filling operation. Bar 231 is adapted to be reciprocated relative to the bar 232. As will be presently explained each bar incorporates a suction nozzle to aid in opening the bag, and to provide a safety means. Bar 231 is shown mounted upon the forward ends of a pair of spaced horizontal racks 233 (Figure 14). These racks are slidably carried by the mounting 201, and engage a pair of pinions which are mounted upon the shaft 234 (Figure 11). This shaft in turn carries a pinion within a housing 235, and which engages the operating rack 236. The rack 236 has an adjustable connection 237 with the adjustable throw lever 238, which in turn is pivotally attached at 239 to the mounting 201. Link 241 serves to connect lever 238 with a cam arm 242, which in turn has a pivotal connection 243 with the frame of the machine. A cam roller 244 carried by arm 242 engages the surface of cam 245, which in turn is mounted upon the shaft 129. Tension spring 246 serves to urge the roller 244 in cam engaged position. As the shaft 129 rotates the rocking of arms 242 and 238 reciprocates rack 236, and as a result the shaft 234 is turned in opposite directions to project and retract the gear racks 233 together with the bar 231. Bar 232 is carried by the adjacent portion of the mounting 201, immediately behind the spout 207, when the latter is in its lowered position (Figure 11).

The valve gate 208 is preferably operated in unison with the reciprocation of the bar 231. Thus an arm 247 extends from the bar 231, and serves to mount the vertical pin 249, which slidably extends through an aperture in the gate 208. This arrangement permits raising or lowering of the head 206, while at the same time enabling reciprocation to be applied to the bar 231 to effect opening and closing of the gate 208.

Previous reference has been made to the use of pneumatic suction nozzles in conjunction with the bars 231, 232. Thus each bar 231, 232 (Figure 18) is provided with a centrally located port or nozzle 251, 252, and these ports are normally covered by the perforated plates or screens 253, 254. Port 251 is connected to a duct 256, which in turn is connected by the flexible hose 257 with the duct 258 in the bar 232. Duct 258 connects with a pipe 259 which extends to the rotary valve 261 (Figure 10). This valve in turn connects to a source of pneumatic suction, as will be presently explained, whereby at predetermined intervals suction is applied to both the nozzles or ports 251, 252, to cause the adjacent side portions of the bag to adhere to the bars 231, 232.

Pipe 262 serves to connect the valve 261 with a source of suction, and the valve in this instance is operated between open and closed positions by suitable means including a reciprocating member 263 (Figures 10), which has its upper end pivotally connected at 264 with the rotary operating part of the valve 261. The lower end of member 263 is forked at 266 to accommodate the shaft 129, and is also provided with a cam roller 267, engaging a cam 268. Cam 268 is likewise secured to the shaft 129. A tension spring 269 serves to urge the member 263 downwardly, to maintain the roller against the surface of the cam 268.

The source of suction can be a suitable suction pump 271 (Figure 9) driven continuously by the electric motor 272, and connected by pipe 273 and hose 274 with the pipe 262 of the valve 261.

Previous reference has been made to turning of shaft 192 at regular intervals for the purpose of causing the measuring apparatus to deliver measured quantities of the product into the conduit 189. Operating means for recurrently turning the shaft 192 is shown in Figure 14. Thus shaft 192 is shown attached to a ratchet wheel 281 which is adapted to be locked against counterclockwise rotation by the spring pressed pawl 282. A member 283 is journaled upon shaft 192 and carries a spring pressed pawl 284 which is adapted to engage the teeth of wheel 281, and turn the same in a clockwise direction. Member 283 is connected to an operating link 286 which extends rearwardly to the wheel or disc 287. Disc 287 is mounted upon a vertical rotating shaft 288, and carries a pin 289 which engages in an L shaped opening or slot 291 provided in the corresponding end of the link 286. A tension spring 292 applied between link 286 and pin 289 normally urges the link to engage the pin 289 in that leg of the slot 291 illustrated in Figure 14, to thereby secure full movement of link 286 as disc 287 rotates. However when link 286 is shifted against the tension of spring 292 so that the pin 289 rides in the other leg of slot 291 (i. e. that leg parallel to the length of link 286) the throw imparted to the link 286 and the corresponding angular movement applied to member 283 is substantially less and insufficient to enable pawl 284 to engage the next successive shoulder of the ratchet wheel 281. Therefore under such circumstances continued turning of the disc 287 does not cause corresponding recurrent rotation of the ratchet wheel 281. This is a part of the safety means to prevent or disable the measuring device under certain circumstances, and which will be presently described in greater detail. To shift the link 286 laterally with respect to pin 289, it is attached to a second link 293 which connects with the solenoid 294.

To review operation of the measuring and bag filling means, when the machine is in continuous automatic operation and the bags are being successively supplied in position to be filled (between the members 231, 232 and below the spout 207) the shaft 192 extending to the measuring means is being recurrently rotated a predetermined angular amount, so that successive measured charges of the product are delivered downwardly through the conduits 189 and 191 to be temporarily held from entering the spout 207 by the gate valve 208. Figure 24 diagrammatically illustrates the positioning of a bag 1 with its upper end between the members 231 and 232 and immediately below the spout 207. When the bag arrives in this position the rotary valve 261 is actuated to apply suction to both of the nozzles 251, 252, and as a result the two adjacent side walls of the bag are sucked tight against the perforated plates 253, 254. Immediately upon application of suction in this manner, member 231 starts its outward movement away from the member 232 and with the commencement of this movement (see Figure 25) the spout 207 starts downwardly whereby its lower end enters the upper partially open end of the bag. These motions continue until the member 231 reaches the limit of its movement, and at the same time the spout 207 reaches its downward limit. Simultaneously with downward movement of the spout 207 and opening movement of the bag, the gate 208 is opened, whereby the charge of the product is delivered downwardly through the spout into the open bag.

Upon completion of the operation described above the spout 207 is immediately elevated, and in fact the timing can be such that this spout starts to elevate as the charge of product is coming to rest in the bag. At the same time the rotary valve 261 cuts off the supply of suction with the result that the sides of the bag are no longer gripped by the nozzles 251, 252. When the spout 207 has been completely retracted the bag engaging elements come into operation to move the filled bag to the next station, and to move a new bag into position to be filled. Simultaneously with such movements member 231 is again moved inwardly to occupy substantially the position shown in Figure 24, as a new bag comes into place.

In addition to the arrangement for applying suction to the nozzles 251, 252, means is provided whereby if the side walls of the bag are not properly gripped by suction applied to these nozzles, then the measuring means if temporarily disabled, and the valve gate 208 is not operated. This serves to avoid objectionable spill of material in the event a bag is not present to be filled or in the event the bag is not in proper position to receive a charge of material. The safety means described above includes a solenoid 301 (Figure 8) in addition to the solenoid 294. A link 302 connects the solenoid 301 with two parallel vertically extending latch arms 303, which have their lower ends pivoted to the frame at 304. A tension spring 306 serves to normally urge both latch arms 303 in a clockwise direction as viewed in Figure 8. The upper ends of arms 303 (Figure 10) are provided with latching shoulders 307, adapted to engage the studs 308 (Figure 12), which form extensions of the pivotal connections between the arm 219 and link 221, and the arm 238 and link 241. Normally the latch shoulders 307 are not in the path of movement of the studs 308. However when solenoid 301 is energized arms 303 are moved toward the right as viewed in Figure 10, whereby they latch beneath and engage studs 308, to thus prevent the rocking of arms 219 and 238 in a clockwise direction. This serves in turn to prevent the lowering of the spout 207, the movement of bar 231, and the opening of gate 208.

Both of the solenoids 294 and 301 are connected to a common energizing circuit which is under the control of a diaphragm operated switch 311 (Figure 9). The operating chamber of the diaphragm switch 311 is in communication with the pipe 273, whereby when no substantial amount of suction exists within the pipe 273, the contacts are closed to energize the two solenoids 294 and 301. This occurs when the roller valve 261 opens and there is no bag in proper position for sealing over the two nozzle ports 251, 252. Thus under such conditions the spout 207 is not lowered into its filling position, and likewise the gate 208 is not opened. The charge of product upon this gate is held over for the next bag. Simultaneously the measuring device is temporarily disabled.

The sealing unit illustrated consists of a mounting 316 which is carried by the frame of the machine, and which is provided with a pair of electrically heated sealing bars 317, 318. These bars are shown connected by conduits 319, 321 to the temperature control unit 322. Bar 317 is carried by bracket 333 which is fixed to the mounting 316. Bar 318 is mounted upon the reciprocating plunger 334, which is connected by link 336 to a crank arm 337 attached to the vertical shaft 338. A crank arm 339 attached to the lower end of shaft 338 is connected by link 341 to the rocker 342. This rocket carries a cam roller 343, engaging a cam 344, which is mounted upon the shaft 129. Roller 343 is urged toward engaged position by the tension spring 346. Thus during normal operation of the machine the heated bars 317, 318 are recurrently pressed together to close the upper end of a filled bag, thus providing an adequate heat seal. Timing is such that a filled bag is presented to the machine when the bars 317, 318 are open, and thereafter while the bag remains at rest the bars 317, 318 are clamped together upon the upper open end.

In conjunction with the sealing means described above it is desirable to provide means which will generally gather or close the upper portion of the bag above the charge of product. Thus as shown in Figure 16, in the vicinity of the heated bars 317, 318 there is a strip 347 carried by slidably mounted pins 348, and urged forwardly by the compression springs 349. In conjunction with strip 347 there is another strip 350, which is adjustably carried by the bracket 351. Strips 350 and 347, acting upon opposite sides of the bag, above the charge of product, tend to generally gather together the upper part of the bag and to expel excessive air so that the same is better guided and positioned between the heated bars 317, 318.

The majority of the parts forming the drive for the machine have been described above. The main transverse shaft 72 of the bag making machine is driven by a suitable electrical motor (not shown) at a proper speed, and this shaft is provided with a sprocket engaging the chain 352 (Figure 5) which in turn engages a sprocket 353 mounted upon the shaft 129. Shaft 129 also has a sprocket 354 (Figures 11 and 13) engaged by the chain 355, which in turn connects with a sprocket 356 and gearing in housing 357 for driving the shaft 288. Thus the bag making machine and the other working parts, including the conveying means, bag filling means, etc., are driven in proper synchronism.

Previous reference has been made to a weighing station, together with weighing means to check weigh the bags after they have been filled. Suitable means for check weighing is illustrated in Figures 13 and 15. Thus the supporting plate 86b, which is free to move vertically with respect to the other parts of the conveying counter, is attached to the upper ends of the standards 358. Standards 358 are attached to the cross-connecting member 359, which in turn is fulcrumed to one end of the weighing beam 360. The position of the weighing beam is shown by the indicator 361, which is located so that it can be viewed by the operator. Thus when a filled bag comes to rest on the plate 86b, the weight of the contents can be noted by the operator, and at this time the operator may add or subtract articles in order to provide the desired accurate weight.

It is desirable to employ guiding means in conjunction with the conveying means 23 in order to more adequately support the bag in its intermittent movements and in the various operating stages. Thus at the bag filling station (see Figures 24 to 26) it is desirable to provide an inclined strip 362 which is shown adjustably secured by bolts 363 to the stationary spacer strips 364 and which serves to support the outer sides of the bags during the filling operation. A similar guide strip or plate 365 is shown adjacent the sealing station (Figure 16).

As explained in my Patent 2,347,902, it is possible for the bag making machine illustrated to be adjusted to manufacture heat sealed bags of the type having side tucks, that is with interfolded side edges, or plain bags may be made without such interfolds. The bag 1 illustrated in Figures 27 and 28 is provided with side tucks or interfolds, and in this instance it is made of either Pliofilm or moisture-proof Cellophane. Briefly this bag has a folded over and heat sealed bottom 2, a longitudinal overlap seal 3 on one side of the bag, and side tucks or interfolds 4. For the length of the bag indicated by the letter a, the side edges of the bag are creased, but for the remainder of the distance b at the top of the bag, the sides are uncreased. Therefore the top end of the bag tends to spring apart, somewhat as illustrated in Figure 28. This construction is obtained by virtue of the fact that as the bag is being withdrawn from the forming mandrel by the rollers 43 and 44, these rollers are squeezed together to form the creased sides for the distance a. However, during the cutting operation, the rollers 43 and 44 are separated, and then when they are further rotated to advance the finished bag, they are not pressed together. The bag construction just described is quite advantageous for use with my machine, because the natural tendency of the top of the bag is to spring apart to open position aids in insuring proper opening of the bag at the filling station.

Operation of the machine as a whole can be summarized as follows: Assuming that the machine is in continuous operation, the bag making proceeds to manufacture bags successively and these bags are delivered at regularly spaced intervals by the belt conveying means 22 to the receiving station of the intermittent conveying means 23. The bag is then engaged by the bag engaging elements 91 to 96 inclusive to advance the same step by step, through the various operating stations. When the bag reaches the filling station it is opened automatically to receive the filling spout 207, and to receive a measured amount of product. From thence the bag is passed to the check weigh station, where the operator notes the weight of the bag, and may add or subtract articles as may be desired. From thence the bag passes on to the heat sealing station where the top of the bag is automatically heat sealed. Thereafter the bags may be automatically discharged to suitable packing means, or may be automatically delivered and lined up on a suitable counter or table extension.

It will be evident that the conveying means described above serves to effectively transfer the bags from the bag making unit to the various operating stations. The bags are moved intermittently over predetermined distances, and while being moved the bags are engaged in such a manner as to avoid injury and to prevent spill after the bags have been filled. The conveying means is readily adjustable to accommodate bags of different sizes and to accommodate addditional operating stations.

The machine disclosed in the aforementioned copending application 55,395, now Patent No. 2,676,242, may be modified in various respects. Thus another type of bag filling means is illustrated in Figures 31 and 32. In this case the head 366 is attached to the vertical parallel racks 211, and connects with the conduit 191, the same as the previous type of filling means described with reference to Figure 10. In place of using the spout 207 I provide a pair of pallets or blade-like members 367, 368. Member 367 is attached to the body of the head 366, while member 368 is attached to a slide 369, which is slidably guided in the head 366. A compression spring 370 acts between the slide 369, and a secondary member 371, which is mounted for limited lost motion or sliding movement with respect to the slide 369. The bar 231 carries an extension arm 372, which is apertured to receive a pin 373, the latter extending downwardly from the member 371. The arrangement and cycling is such that when the head 366 starts its downward movement the two blade-like members 367, 368 enter the mouth of the bag, and substantially simultaneously with their entry into the bag are moved apart. Near the limit of their movement away from each other, the suction applied to the nozzles in bars 231 and 232 is relieved, whereby the mouth of the bag is stretched over the members 367 and 368, as illustrated in Figure 32. The stretching tension exerted upon the upper part of the bag is regulated by the tension of spring 370. In other words as members 367 and 368 come to final position some motion occurs between the slide 369 and member 371, which is accommodated by the spring 370. Therefore the force of spring 370 is exerted in applying tension to the top of the bag, to stretch the same about the members 367 and 368. Opening movement of the blade-like members 367, 368 simultaneously acts as a valve to permit the product to drop down into the bag.

Assuming that the bag is one having pleats or gussets along its sides, a novel result is obtained by using the apparatus shown in Figures 31 and 32. As the upper part of the bag is opened and stretched about the members 367, 368, the bag is effectively shortened because of opening of the side gussets, and as a result the lower end of the bag is lifted a short distance from its normal supporting surface. However upon the product being discharged into the bag, and the bag being released at the end of the filling operation, the bag drops down against its supporting surface, thus jarring the contents of the bag to secure a desired settling of the contents, and with a desired expansion and filling out of the lower portion of the bag.

In place of a bag filling operation which is entirely automatic, it is possible to present the bag to a filling position for manual introduction of products, particularly where the product is of such a character that it cannot be readily handled by automatic means. Thus as shown in Figure 33 a head 376 is provided with an open hopper 377. One section 377a of this hopper is fixed to the body of the head 376, as illustrated, and the other section 377b is carried by the horizontally movable slide member 378. Blade members 379 and 381, corresponding to the members 367 and 368 of Figure 31, are likewise attached respectively to the body of the head 376 and to the slide member 378. The side walls of the hopper 377 can be formed overlapping as illustrated in Figure 34.

With the arrangement illustrated in Figures 33 and 34, during a filling operation the members 379 and 381 enter the open end of the bag and are then spread apart for a manual filling operation. When the members 379 and 381 are moved apart to the extent of their permissible movement, they serve in effect to stretch the upper part of the bag to facilitate introduction of the product. The operator may now introduce a measured amount of material, such as a vegetable, into the hopper 377 and down into the bag. To facilitate carrying out such a manual filling operation it is desirable to provide the drive of the machine with a cycling clutch, released as by means of a foot pedal, whereby an operator may permit sufficient pause in the cycle of operation for manual filling.

While it is desirable to use a bag making machine which is of the type disclosed in my Patent 2,347,902, it should be understood that other types of bag making machines can be employed which are capable of producing bags successively for supplying the same to the intermittent conveying means 23. In some instances the bags may be made with seams which are in part or entirely secured together by glue, rather than by heat sealing. As is known to those skilled in the operation of such bag machines, it is possible by use of suitable attachments to manufacture bags having so-called duplex or double walls, in place of the conventional single wall bags. Likewise suitable attachments can be used to form heat seals between the walls of such duplex bags. By the use of another attachment printed labels can be inserted in the bag or between the walls thereof. It is also possible to provide an attachment for applying printing directly on the bags, and which for example may be provided with a suitable photoelectric control to insure proper positioning of the printing.

I claim:

1. Intermittent conveying means for the movement of a number of bags comprising an extended horizontal support for the bags and along which the bags may be intermittently moved, a rotatable shaft extending generally in the same direction as the direction of movement of the bags, a plurality of longitudinally spaced operating units disposed along the shaft, each unit including a body through which the shaft extends together with a bag engaging element slidably carried by each body for reciprocation laterally of the shaft and into and out of the path of movement of the bags and motion transmitting means connecting the shaft with said element to reciprocate the element responsive to the rotation of the shaft in opposite directions, means for simultaneously reciprocating all of said operating units in a direction longitudinally of the shaft, guideway means extending parallel to the shaft for guiding the bodies of said units and for retaining said bodies against rotation about the shaft, and means for effecting cyclic rotation of the shaft in opposite directions in synchronism with such reciprocation of said units.

2. Intermittent conveying means as in claim 1 in which the units are connected to the shaft at predetermined adjustable positions and in which the shaft is reciprocated longitudinally to effect reciprocation of said units.

3. Intermittent conveying means as in claim 2 wherein the bag engaging elements engage the trailing sides of said bags together with first bag supporting members for engaging the advancing sides of said bags, said first bag supporting members being carried by said bag engaging elements for reciprocating movement in a direction longitudinally of the path of movement of the bags and in a direction laterally of the shaft into and out of the path of movement of said bags.

4. Intermittent conveying means as in claim 3 together with second bag supporting members disposed generally between said bag engaging elements for engaging the side faces of said bags, said last named bag supporting members being carried by said operating units or reciprocating movement in a direction longitudinally of the path of movement of the bags.

5. Intermittent conveying means for the movement of a number of bags along a predetermined path comprising an extended horizontal support for the bags along which the bags may be intermittently moved, guideway means extending longitudinally of the path of movement of the bags, a plurality of operating units carried by said guideway means for longitudinal movement along the same, each of said units including a body and a bag engaging element slidably carried by said body, a shaft extending longitudinally of the guideway means and having operative connections with all of said operating units, said guideway means serving to retain the body of each of said units against rotation about said shaft, said bag engaging elements being adapted to engage the trailing sides of said bags, means for separately rotating said shaft and for reciprocating the same in a longitudinal direction, means incorporated in each of said units for reciprocating the bag engaging elements responsive to the rotation of said shaft to thereby advance and retract each of said bag engaging elements from the path of movement of the bags, first supporting members for engaging the advancing sides of said bags, said bag supporting members being carried by said bag engaging elements for reciprocating movement in a direction longitudinally of the path of movement of the bags and for reciprocating movement laterally of the guideways into and out of the path of movement of said bags, second bag supporting members disposed generally between said bag engaging elements for engaging the side faces of said bags, said bag supporting members being carried by said operating units for reciprocating movement in a direction longitudinally of the path of movement of the bags responsive to reciprocation of said shaft, the cycle of operation of said bag engaging elements and said first and second bag supporting members being such that the bag engaging elements and the first bag supporting members are projected to engage the trailing and advancing sides of the bags and move longitudinally of the path of movement of the bags to translate the bags to a new position, said last named movement being accompanied by a like movement of said second bag supporting members, said bag engaging elements and said first bag supporting members being retracted from engagement with the bags upon translating the bags to the new position and returned to their original position, said second bag support members being moved longitudinally to their original position in synchronism therewith.

6. Intermittent conveying means for the movement of bags comprising a horizontal supporting table forming a path along which bags are adapted to be intermittently moved, a plurality of operating units for pushing said bags along said table, each of said operating units including a body and a bag engaging element slidably mounted in said body, means for reciprocating said operating units longitudinally of the path of movement of said bag and for reciprocating said bag engaging elements into and out of the path of movement of said bags, said bag engaging element engaging the trailing sides of said bags, first bag supporting means attached to said bag engaging elements and including a member for supporting the advancing sides of said bags, and second bag support means attached to said operating units and including a member for supporting the side faces of said bags, said bag engaging elements and said first bag support means being reciprocated into and out of the path of movement of said bags at periodic intervals, and said bag engaging elements and said first and second bag support means being reciprocated longitudinally at periodic intervals.

7. Intermittent conveying means for the movement of bags comprising a horizontal supporting table forming a path along which the bags are adapted to be intermittently moved, means including a bag engaging element for periodically engaging the trailing sides of said bags, then pushing said bags a predetermined distance, and then disengaging said bags, first bag support means including a member for supporting the advancing sides of said bags, and second bag support means including a member for supporting side faces of said bags, said last named member being reciprocated in synchronism with said bag engaging element in a direction longitudinally of the path of movement of said bags.

References Cited in the file of this patent

UNITED STATES PATENTS

| | | |
|---|---|---|
| 1,027,111 | Dwight | May 21, 1912 |
| 1,039,785 | Nevill | Oct. 1, 1912 |
| 1,309,785 | Taylor | July 15, 1919 |
| 1,627,391 | House | May 3, 1927 |
| 1,858,320 | Beardsley et al. | May 17, 1932 |
| 1,958,341 | Hurxthal | May 8, 1934 |
| 2,011,839 | Anderson | Aug. 20, 1935 |
| 2,583,106 | Kayat | Jan. 22, 1952 |